United States Patent [19]
Duer

[11] 3,896,684
[45] July 29, 1975

[54] NON-CHATTERING CLUTCH FOR A LIMITED SLIP DIFFERENTIAL MECHANISM

[75] Inventor: Morris J. Duer, Lansing, Mich.

[73] Assignee: General Motors Corporation, Detroit, Mich.

[22] Filed: Nov. 5, 1973

[21] Appl. No.: 412,573

[52] U.S. Cl................. 74/711; 74/713; 192/107 R; 192/107 C; 192/109 A
[51] Int. Cl.......................... F16h 1/44; F16d 13/68
[58] Field of Search........... 74/711, 713; 192/107 R, 192/107 C, 109 A, 106.1, 106.2, 55

[56] References Cited
UNITED STATES PATENTS

| | | | |
|---|---|---|---|
| 2,189,534 | 2/1940 | Ingersoll et al. | 192/107 C X |
| 3,313,180 | 4/1967 | Balfour et al. | 192/107 R X |
| 3,361,009 | 1/1968 | Wojcikowski | 74/711 |
| 3,477,312 | 11/1969 | Duer | 74/711 |
| 3,490,312 | 1/1970 | Seitz et al. | 74/711 |
| 3,495,298 | 2/1970 | Engle et al. | 74/711 X |
| 3,527,120 | 9/1970 | Duer et al. | 74/711 |

Primary Examiner—Samuel Scott
Assistant Examiner—Lance W. Chandler
Attorney, Agent, or Firm—Robert M. Sigler

[57] ABSTRACT

A non-chattering limited slip differential includes a clutch pack with alternating clutch plates of two types, one type being a conventional annular clutch plate. The other type comprises inner and outer annular members joined in a neck section which allows relative movement between the members. The outer member has an indentation diametrically opposite the neck section and the inner member has a tab projecting radially outward into the indentation to limit the relative movement between the members.

1 Claim, 3 Drawing Figures

3,896,684

NON-CHATTERING CLUTCH FOR A LIMITED SLIP DIFFERENTIAL MECHANISM

BACKGROUND OF THE INVENTION

Limited slip differentials having clutch means arranged to frictionally resist differential action are well known in the art relating to automotive vehicle drives. A common problem with such differentials, however, is the generation of chattering noise during slow differential action, which noise can be objectionable to vehicle occupants.

The problem is known to have its origin in the clutch pack and particularly in the different levels of frictional force produced between the clutch plates depending on whether the plates are still or moving with respect to one another. The torque necessary to cause two adjacent plates to move with respect to each other must overcome the force of static friction between the plates before the plates begin to slip with respect to one another. As soon as one plate slips against another, however, the friction between the plates changes from static to dynamic and causes a sudden drop in the frictional force resisting slippage of the plates. The parts of the differential that bear the torque tend to unwind to reduce that torque to a level to balance the dynamic friction force between the plates. However, in unwinding, these parts overshoot that equilibrium level and subject the plates to a reverse torque which tends to slow down the relative slippage. Under certain conditions the plates can be brought to a standstill relative to one another, at which point the friction between them becomes static. The torque must once again build up before the plates will again move relative to one another; and the cycle can be repeated indefinitely. The alternate sticking and slipping of the clutch elements results in a series of physical shocks which are transmitted through the drive gear to the vehicle body, where they are felt or heard by the vehicle occupants as chatter.

SUMMARY OF THE INVENTION

This invention relates to a non-chattering limited slip differential. In particular, the invention relates to a limited slip differential mechanism containing a clutch pack with improved clutch members which do not exhibit the alternating stick-slip behavior of conventional clutch plates. These clutch plates and the limited slip differential mechanism in which they are used are described in the following summary of the drawings and description of the preferred embodiment.

DESCRIPTION OF THE PREFERRED EMBODIMENT

Figure 1:
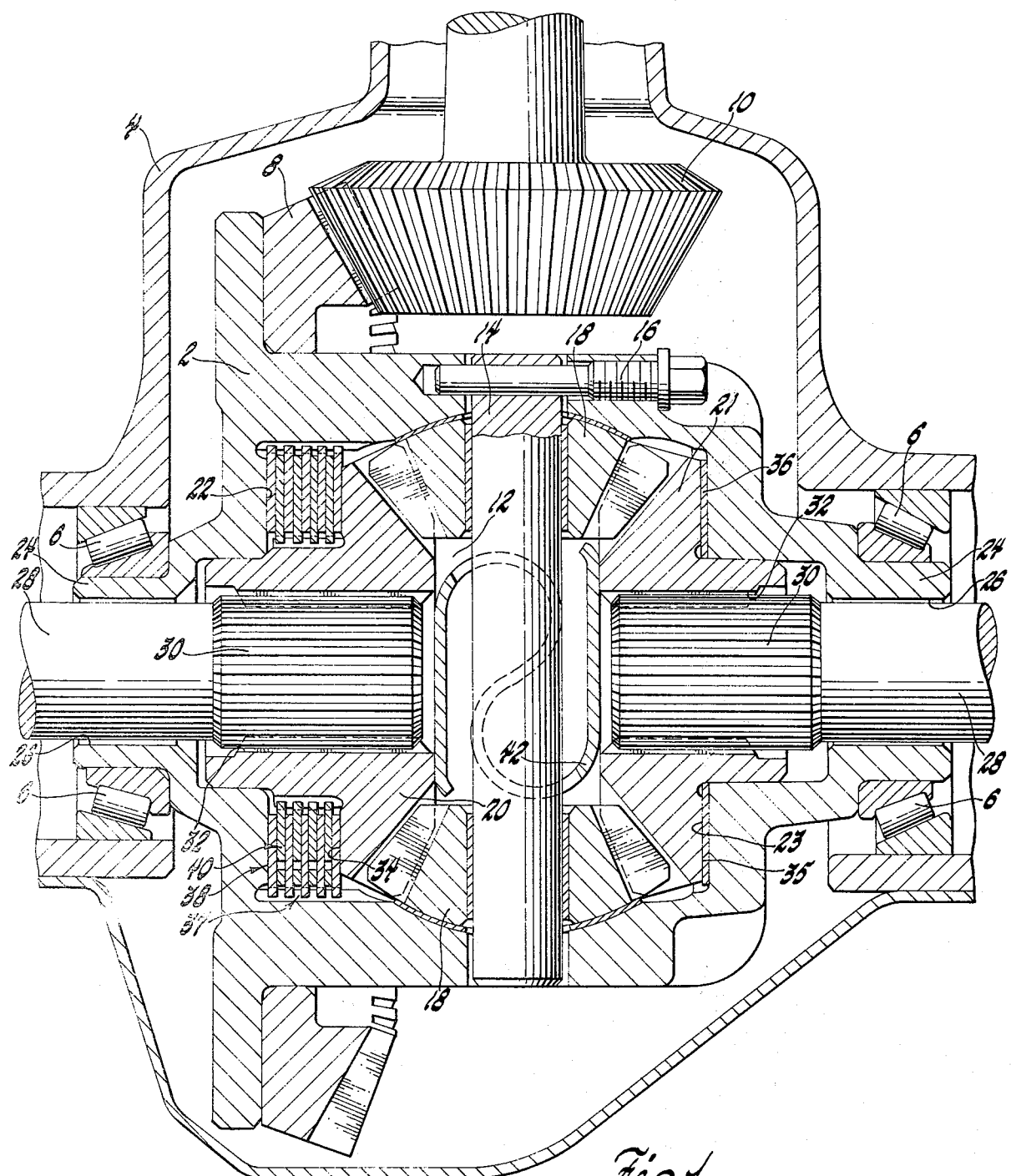
FIG. 1 shows a cutaway view of a limited slip differential.

Referring to FIG. 1, a casing 2 is rotatably supported in a housing 4 by roller bearings 6. The casing 2 carries a ring gear 8 which is engaged by a drive pinion 10 rotatably carried in the housing 4 and engagable with the engine of a vehicle for the purpose of rotatably driving the casing 2.

The casing 2 defines an interior cavity 12 and contains a pin 14 extending therethrough and anchored by a bolt 16. Pin 14 carries a pair of pinion gears 18 which are rotatable thereon.

The interior cavity 12 also contains a pair of side gears 20 and 21. The side gears 20 and 21 are drivingly engaged by the pinion gears 18 to form a standard differential gear train.

The casing 2 has formed on its interior surface a pair of oppositely facing annular end walls 22 and 23. Adjacent the end walls are extending journals 24 carried in the roller bearings 6 and having member receiving openings 26. An axle shaft 28 with a splined end 30 inside cavity 12 extends through each of the openings 26 out of the casing 2 for driving the vehicle wheels, not shown.

Each of the side gears 20 and 21 has a central splined aperture 32 therein, into which the splined end 30 of one of the axle shafts 28 is inserted to be driven thereby. The side gears 20 and 21 also have outward facing annular faces 34 and 35 adjacent annular end walls 22 and 23 of the casing 2, respectively. Between the annular end wall 22 of the casing 2 and the annular face 34 of the side gear 20 is a clutch pack 37 comprising a plurality of clutch members 38 splined in the inside of the casing 2 alternating with a plurality of clutch members 40 splined to the side gear 20. The clutch members 38 and 40 are described more fully below. Between annular end wall 23 of the casing 2 and annular face 35 of the side gear 21 is a spacer element 36. Of course, this spacer element 36 could be replaced by a clutch pack similar to the clutch pack 37 if additional clutch capacity were desired. A generally "S" shaped spring 42, which straddles the pin 14 at the center of the interior cavity 12, engages the side gears 20 and 21 and biases them outward to load the clutch pack 37 and spacer element 36 against the casing 2. The elements of the differential mechanism as described thus far combine in the normal manner to transmit torque from the drive pinion 10 to the axle shafts 28 and, to an extent limited by the friction between the clutch pack 37, casing 2 and side gears 20 and 21, to distribute that torque equally or unequally between the two axle shafts 28 as required.

Figure 2:
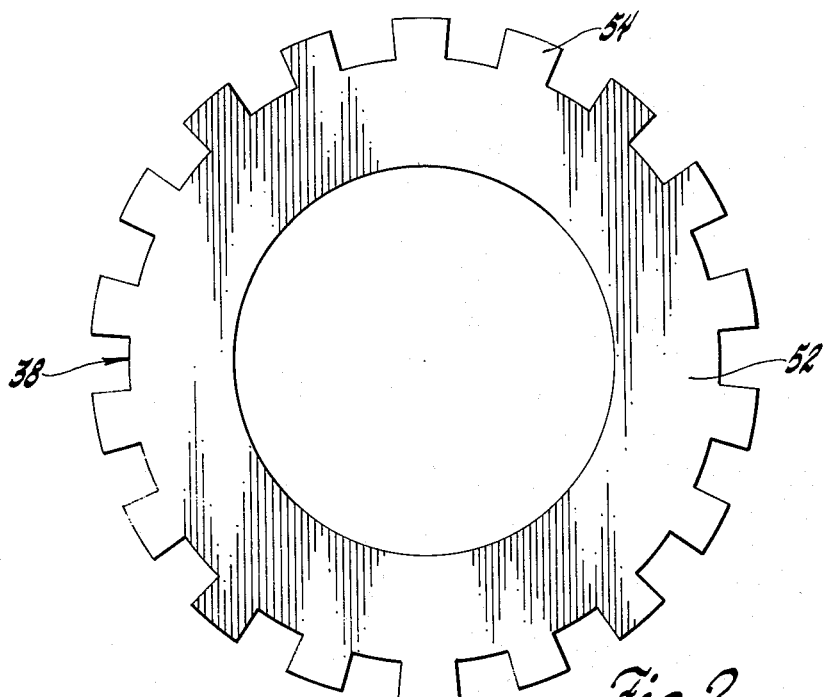
FIG. 2 shows a clutch plate for use in the differential mechanism of FIG. 1.

The clutch pack 37 will now be described in detail. The clutch pack 37 comprises a plurality of clutch plates formed from sheet metal with a shape similar to that of clutch plate 38 in FIG. 2 or clutch plate 40 in FIG. 3. Clutch plate 38, as shown in FIG. 2, is a standard clutch plate for use in limited slip differentials comprising an annular disk 52 with teeth 54 around its outer circumference for engagement with the casing 2 of the differential mechanism.

Figure 3:
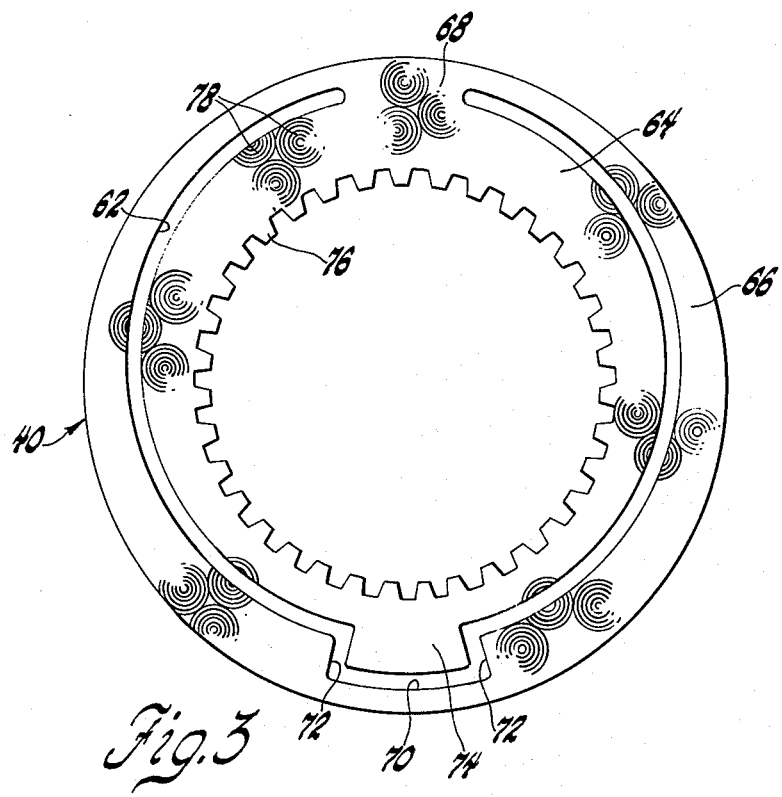
FIG. 3 shows another clutch plate for use in the differential mechanism of FIG. 1.

Clutch plate 40, as seen in FIG. 3, is formed from a flat annular ring of metal, the non-tooth portion of which has inner and outer radii approximately the same as those of the non-tooth portion of the clutch plate 38. The ring is separated by a peripheral groove 62, however, into an inner annular member 64 and an outer annular member 66 connected only by a neck portion 68. In an area diametrically opposite the neck portion 68, the peripheral groove 62 jogs radially outward to form an indentation 70 with sides 72 in the outer annular member 66 and a radially outwardly extending tab 74 in the inner annular member 64. A plurality of standard teeth 76 for engagement with splines on the side gear 20 are arranged around the inner circumference of the clutch plate 40.

The clutch plates 38 and 40 are arranged alternately in the clutch pack 37 so that each clutch plate 40 has a clutch plate 38 on each side of it. The flat surface of the clutch plate 40 is shown as being covered with a pattern of shallow grooves 78 such as those shown in FIG. 3. The clutch plates 38 and 40 are designed to operate with a lubricant in the interior cavity 12; and the grooves 78 constitute a standard surface treatment of clutch plates to spread and retain lubricant evenly across the surface of the plate. Of course, other well known groove patterns or other surface treatments could be used instead.

In operation, consider a clutch plate 38 and another clutch plate 40 biased together by the S shaped spring 42. As differential action starts, opposite torques are applied to the clutch member 38 from the casing 2 through the teeth 54 and to the clutch member 40 from the side gear 20 through teeth 76. In reference to clutch member 40, however, it can be seen that, although the torque is applied evenly around the circumference of the inner annular member 64 through the teeth 76, the torque is applied to the outer annular member 66 only through the neck portion 68, resulting in less torque being applied to most of the outer annular member than to the inner annular member.

When the torque applied to the inner annular member 64 overcomes the static friction resistance of the clutch plates 38 and 40, the inner annular member 64, neck portion 68, and that portion of the outer annular member 66 adjacent neck portion 68 break away from the clutch plate 38 and begin to rotate relative thereto. When this rotation beings, two things happen simultaneously in the clutch plate 40. Since the tab 74 is part of the rotating inner annular member 64, and the indentation 70 is located in a non-rotating portion of the outer annular member 66, the tab 74 will move peripherally toward the side 72 of the indentation 70 in the direction of its motion. At the same time, since the movement of any small portion of the clutch plate 40 causes another small portion adjacent to it to also break loose and move, the breaking of static conditions proceeds in waves around both directions in outer annular member 66 from the neck portion 68. It has been found in tests that eventually the entire outer annular member 66 breaks loose and rotates with the tab 74 abutting the side 72 of indentation 70. There is no additional sticking or resumption of static conditions between adjacent clutch plates until differential action ceases.

It can be seen that the apparatus described offers an attractive solution to the problem of chattering limited slip differentials. It could be easily produced, since it requires only the substitution of some new clutch elements in a standard limited slip differential. The clutch elements as shown could be reversed — that is, clutch member 40 could be formed with teeth on the outer circumference and clutch member 38 could be formed with teeth on the inner circumference — without degradation of non-chattering limited slip differential action. Other equivalents will occur to those skilled in the art; and the invention should therefore be limited only by the following claims.

I claim:

1. A limited slip differential mechanism including a rotatable casing, a pair of output members rotatably received in said casing and adapted to be driven thereby, a gear train comprising intermeshing gears rotatably carried in said casing and interconnecting said output members and said casing for rotation together such that rotation of said output members relative to one another causes rotation of said gear train relative to said casing, and clutch means for frictionally connecting two relatively rotatable parts of said differential mechanism so as to resist relative rotation of said output members, said clutch means including a plurality of frictionally engaged clutch elements arranged alternatively in two groups, the elements of one group being connected for rotation with one of said rotatable parts and the elements of the other group being connected for rotation with the other of said rotatable parts, at least one of said elements comprising a clutch plate having generally annular inner and outer members connected by a neck portion over a small portion of their circumferences, said neck portion being adapted to allow relative movement between said inner and outer annular members, said clutch plate being connected for rotation with one of said rotatable parts only through one of said annular members, said outer annular member having an indentation in the radially inner edge thereof diametrically opposite said neck portion and said inner member having a tab projecting radially outward therefrom into said indentation, said tab being adapted to abut one of the ends of said indentation upon relative movement of said inner and outer annular members to limit said relative movement.

* * * * *